United States Patent
Wang et al.

(10) Patent No.: US 11,242,582 B2
(45) Date of Patent: Feb. 8, 2022

(54) METHOD OF MAKING COMPONENTS WITH METAL MATRIX COMPOSITES AND COMPONENTS MADE THEREFROM

(71) Applicant: Purdue Research Foundation, West Lafayette, IN (US)

(72) Inventors: Xiaoming Wang, West Lafayette, IN (US); Qingyou Han, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 292 days.

(21) Appl. No.: 16/226,946

(22) Filed: Dec. 20, 2018

(65) Prior Publication Data

US 2019/0194785 A1 Jun. 27, 2019

Related U.S. Application Data

(60) Provisional application No. 62/609,933, filed on Dec. 22, 2017.

(51) Int. Cl.
*C22C 32/00* (2006.01)
*B22F 9/08* (2006.01)
(Continued)

(52) U.S. Cl.
CPC ............ *C22C 32/0073* (2013.01); *B22F 9/08* (2013.01); *B22F 10/20* (2021.01); *B22F 1/0018* (2013.01);
(Continued)

(58) Field of Classification Search
CPC ........ C22C 32/0073; B22F 10/20; B22F 9/08; B22F 1/0018; B22F 2201/20;
(Continued)

(56) References Cited

U.S. PATENT DOCUMENTS

| 7,988,764 B2 * | 8/2011 | Birol | C22C 1/03 75/685 |
| 2016/0032175 A1 * | 2/2016 | Norman | C09K 8/03 166/303 |
| 2019/0032175 A1 * | 1/2019 | Martin | C22C 1/0416 |

OTHER PUBLICATIONS

Mahmudi et al. ("Improved properties of A319 aluminum casting alloy modified with Zr." Materials Letters 60.21-22 (2006): 2606-2610.) (Year: 2006).*

(Continued)

*Primary Examiner* — Anthony J Zimmer
*Assistant Examiner* — Ricardo D Morales
(74) *Attorney, Agent, or Firm* — Hartman Global IP Law; Gary M. Hartman; Domenica N. S. Hartman

(57) ABSTRACT

Methods for manufacturing components that include casting a first melt to produce an ingot, remelting the ingot to form a second melt, forming a powder from the second melt using an atomization process, and fabricating a component utilizing the powder in an additive manufacturing process. The ingot and the powder include an aluminum matrix that contains dispersions of $TiB_2$ particles and $Al_3Ti$ particles and the component is a metal matrix composite having an aluminum matrix that contains dispersions of $TiB_2$ particles and $Al_3Ti$ particles. Optionally, the metal matrix composite may include particles of an intermetallic compound of aluminum and at least one alloying element.

12 Claims, 6 Drawing Sheets

(51) Int. Cl.
  *B22F 10/20* (2021.01)
  *B33Y 10/00* (2015.01)
  *B33Y 70/00* (2020.01)
  *C22C 1/05* (2006.01)
  *C22C 29/14* (2006.01)
  *C22C 1/04* (2006.01)
  *C22C 21/00* (2006.01)
  *B22F 1/00* (2006.01)

(52) U.S. Cl.
  CPC ..... *B22F 2201/20* (2013.01); *B22F 2301/052* (2013.01); *B22F 2301/205* (2013.01); *B22F 2301/45* (2013.01); *B22F 2302/05* (2013.01); *B22F 2303/01* (2013.01); *B22F 2303/15* (2013.01); *B22F 2998/10* (2013.01); *B22F 2999/00* (2013.01); *B33Y 10/00* (2014.12); *B33Y 70/00* (2014.12); *C22C 1/0416* (2013.01); *C22C 1/05* (2013.01); *C22C 21/00* (2013.01); *C22C 29/14* (2013.01)

(58) Field of Classification Search
  CPC .......... B22F 2301/052; B22F 2301/205; B22F 2301/45; B22F 2302/05; B22F 2303/01; B22F 2303/15; B22F 2998/10; B33Y 10/00; B33Y 70/00
  See application file for complete search history.

(56) References Cited

OTHER PUBLICATIONS

Mohanty et al. ("Mechanism of Grain Refinement in Aluminum," Acta metal. Mater, col. 43, No. 5, pp. 2001-2012) (Year: 1995).*

* cited by examiner

METHOD OF MAKING COMPONENTS WITH METAL MATRIX COMPOSITES AND COMPONENTS MADE THEREFROM

CROSS REFERENCE TO RELATED APPLICATIONS

This application claims the benefit of U.S. Provisional Application No. 62/609,933, filed Dec. 22, 2017, the contents of which are incorporated herein by reference.

BACKGROUND OF THE INVENTION

The present invention generally relates to fabrication of aluminum matrix composites. The invention particularly relates to the fabrication of aluminum matrix composites for elevated temperature applications, and more particularly fabrication by additive manufacturing.

Al—Ti—B metal matrix composites (MMCs) are conventionally produced through traditional casting processes resulting in components having typical casting microstructures. For example, cast Al—$TiB_2$—$Al_3Ti$ MMCs generally have, as reinforcing particles, intermetallic $Al_3Ti$ particles located near centers of the aluminum grains and ceramic $TiB_2$ particles that are forced into the aluminum grain boundaries. FIG. 1A is a scanning electron microscopy (SEM) image of a cast Al—$TiB_2$—$Al_3Ti$ composite having this type of microstructure. Referring to FIG. 1A, the bright blocky particles are $Al_3Ti$ and the smaller particles along the aluminum grain boundaries are $TiB_2$. $TiB_2$ particles may also be situated in the grain boundaries in the absence of $Al_3Ti$ particles. FIG. 1B is a transmission electron microscopy (TEM) image showing the $TiB_2$ particles such as those shown in FIG. 1A. The segregation of reinforcing particles makes the production of uniform dispersion of reinforcing particles, and therefore homogeneous properties, difficult through traditional casting processes. A great effort has been made to promote a more uniform dispersion of the reinforcing particles, such as through the addition of other alloying elements to modify the Al/reinforcing particle interfacial energies, spray forming, etc. However, the segregation of reinforcing particles is still common among Al—Ti—B MMCs.

Additive manufacturing as an emerging technology of producing high strength metals and alloys has shown great potential. However, additive manufacturing has not been applied to MMCs due to several reasons. The primary reason is that conventional MMC production techniques result in relatively large particles which may clog the spray nozzle during additive manufacturing and production of submicron/nano-sized reinforcing particles small enough to avoid clogging can be difficult. Another reason is the lack of knowledge about the intermetallic/ceramic phases in the Al—Ti—B alloying system.

Scandium (Sc) has been used in the production of high strength aluminum alloys for high temperature applications. Scandium has a very small solubility in aluminum and provides precipitation hardening after heat treatment. However, scandium is very expensive and therefore is commonly used in small quantities. Therefore, scandium is generally used in combination with other alloying elements for better performance. FIG. 2 shows a typical microstructure with precipitation hardening achieved by addition of scandium to form intermetallic $Al_3Sc$ particles. Referring to FIG. 2, precipitates of $Al_3Sc$ in an aluminum matrix can be seen which provide a significant effect on blocking dislocations as described in Marquis et al., Acta Materialia 51 (2003) 4751-4760, the content of which is incorporated herein in its entirety by reference.

As the demand for high temperature applications of aluminum increases, especially from the aerospace industries, there is an ongoing desire for less expensive processes for producing Al—Ti—B MMCs with a homogeneous dispersion of reinforcing particles, especially when both $TiB_2$ particles and $Al_3Sc$ particles are present.

BRIEF DESCRIPTION OF THE INVENTION

The present invention provides methods for producing components and components made thereby formed of Al—Ti—B metal matrix composites.

According to one aspect of the invention, a method is provided for manufacturing a component that includes reacting a salt mixture with molten aluminum to form a first melt, and casting an ingot with the first melt. The ingot is then remelted to form a second melt, followed by forming a powder from the second melt using an atomization process and then fabricating the component utilizing the powder in an additive manufacturing process. The ingot and the powder include an aluminum matrix that contains dispersions of $TiB_2$ particles and $Al_3Ti$ particles and the component is a metal matrix composite having an aluminum matrix that contains dispersions of $TiB_2$ particles and $Al_3Ti$ particles.

Another aspect of the invention includes the method described above further including adding at least one alloying element to the first melt and casting the ingot such that the ingot includes particles of an intermetallic compound of aluminum and the at least one alloying element in the aluminum matrix, or adding at least one alloying element to the second melt and atomizing the second melt such that the powder includes particles of an intermetallic compound of aluminum and the at least one alloying element in the aluminum matrix.

According to another aspect of the invention, a component is provided that is made of a metal matrix composite having $TiB_2$ particles, $Al_3Ti$ particles, and particles of an intermetallic compound of aluminum and at least one rare earth element dispersed in an aluminum matrix.

Technical effects of the methods described above include the capability of producing components formed of Al—Ti—B metal matrix composites containing a homogeneous dispersion of reinforcing particles.

Other aspects and advantages of this invention will be further appreciated from the following detailed description.

DETAILED DESCRIPTION OF THE INVENTION

Figure 4:
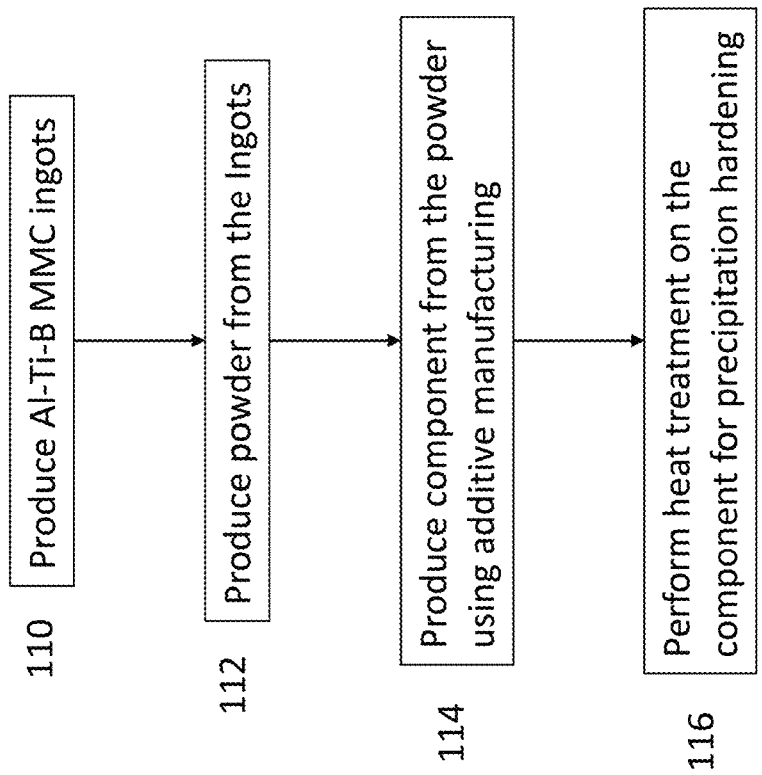
FIG. 4 schematically represents a method of producing Al—Ti—B MMCs in accordance with certain nonlimiting aspects of the invention.

A nonlimiting method suitable for producing Al—Ti—B metal matrix composite (MMC) components that contain reinforcing particles is represented in FIG. 4. In a first step 110, Al—Ti—B alloy ingots are produced. The specific composition achieved may vary depending on the desired application of components to be formed therefrom. Preferably, the ingots include an aluminum matrix comprising ceramic $TiB_2$ particles and optionally intermetallic $Al_3Ti$ particles as a reinforcing phase in the matrix. Formation of the $Al_3Ti$ particles may be controlled based on the cooling rate of the alloy from liquid to solid during casting of the ingots, with an increase in cooling rate generally yielding a decrease in particle size. As a nonlimiting example for producing Al—Ti—B MMC ingots, one or more salt mixtures, for example, $K_2TiF_6$—$KBF_4$, may be mixed and reacted with molten aluminum and then cast by conventional methods as ingots. Preferably, the casting process completely or almost completely removes the spent salt mixtures (i.e., reaction products).

In a subsequent step 112, powder is produced from the cast ingots. The powder may be produced by various powder production methods including but not limited to atomization, ball milling, etc. For example, the cast ingots may be remelted in a crucible and then the resulting melt may be atomized to produce a powder. Preferably both the melting of the ingots and the atomization of the resulting melt are performed in a vacuum. Little to no residue salt mixtures are preferably present in the melt produced from the ingots since such salts would likely evaporate during the remelting/atomization steps and interfere with the desired vacuum atmosphere. The powder preferably comprises an aluminum matrix that contains dispersions of ceramic $TiB_2$ particles, intermetallic $Al_3Ti$ particles, and particles of an intermetallic compound of aluminum and the at least one alloying element, which is used in later method steps for solution and/or precipitation hardening. Any alloying elements in addition to Al, Ti, and B that are included in the composition may be added to the melt during casting of the ingots in step 110 or may be added when the ingots are remelted in step 112 (for example, if a powder production method is used that requires remelting). In a preferred embodiment, the composition includes one or more rare earth elements, preferably scandium, for solution and precipitation hardening. If one or more alloying elements for solution and/or precipitation hardening are added to the melt prior to forming the ingots, the ingots preferably include an intermetallic compound of aluminum and the alloying element(s). Due to their different solubilities in molten aluminum, the intermetallic $Al_3Ti$ particles formed during the casting of the ingots dissolve during subsequent remelting processes, whereas the $TiB_2$ particles survive any subsequent remelting processes, that is, are not remelted with the aluminum matrix and dissolved.

In step 114, a component is fabricated utilizing these powders and employing an additive manufacturing technique. For example, the powder can be deposited and heated by a laser beam or other source of heating to form a component layer-upon-layer. Suitable additive manufacturing methods include but are not limited to powder bed fusion, material jetting, etc. As previously noted the $TiB_2$ particles formed during the casting of the ingots survive during the additive manufacturing process, that is, are not remelted with the aluminum matrix and dissolved. In order to avoid clogging of a spray nozzle during an additive manufacturing process, the process is preferably performed at parameters (time, temperature, etc.) such that the relatively large $Al_3Ti$ particles dissolve, and the $TiB_2$ particles preferably have an average size of about ten micrometers or less, and more preferably about five micrometers or less.

In step 116, the fabricated component may then heat treated to cause precipitation hardening, that is, strengthening as a result of the formation of precipitates. In a preferred embodiment, the composition includes one or more rare earth elements, preferably scandium, for solution and precipitation hardening. Another suitable alloying element for solution and precipitation hardening is zirconium, which can partly or completely replace scandium to lower material costs. The contents of the alloying elements, (for example, Ti, B, Sc, Zr) can vary depending on the desired material properties of the component.

Figures 1A, 1B:
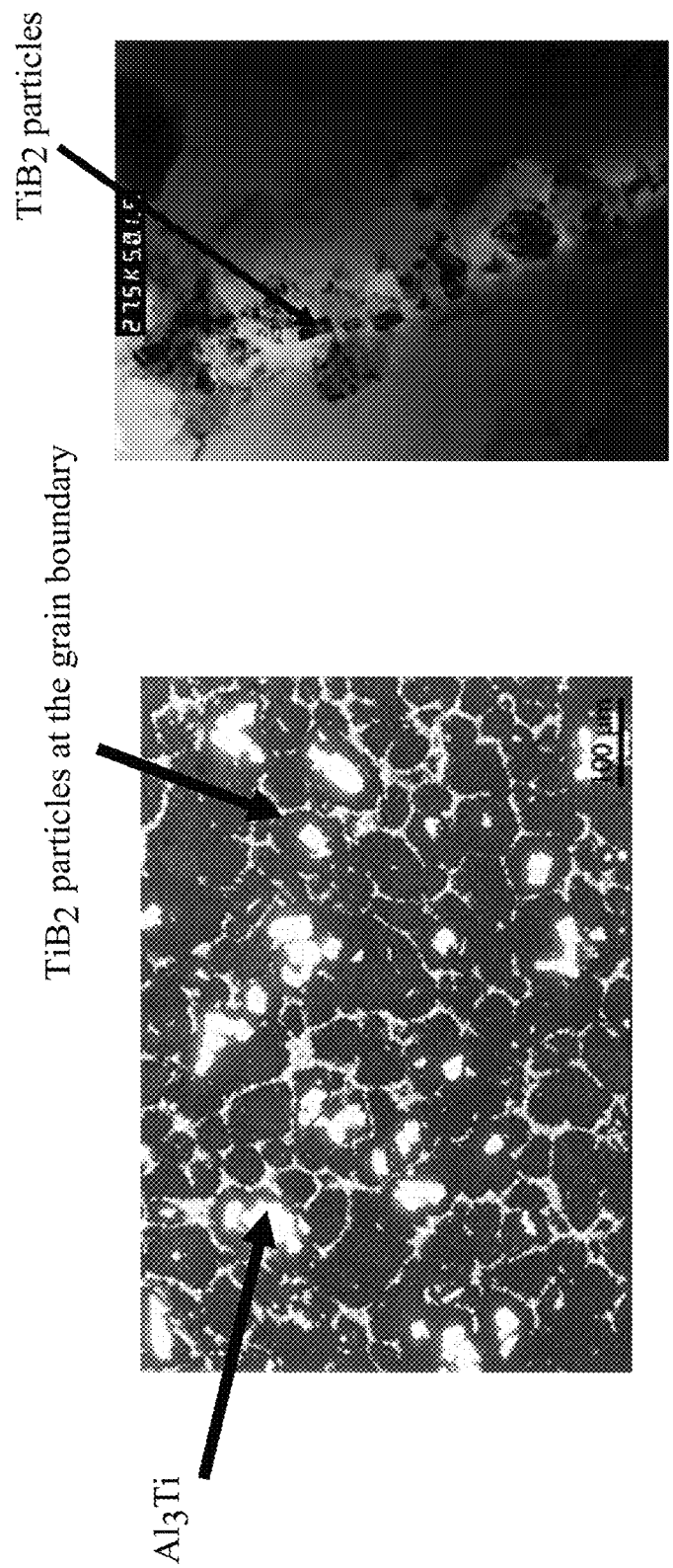
FIG. 1A is a scanning electron microscopy (SEM) image of a cast Al—$TiB_2$—$Al_3Ti$ composite.
FIG. 1B is a transmission electron microscopy (TEM) image showing $TiB_2$ particles in a cast Al—$TiB_2$—$Al_3Ti$ composite.
Figure 2:
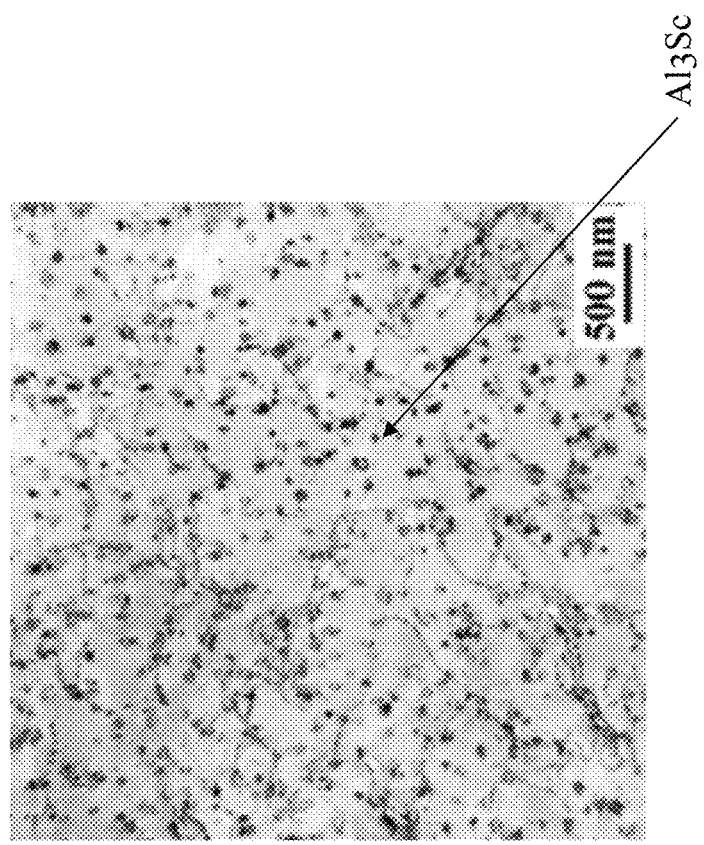
FIG. 2 is an image representing an aluminum alloy with a typical microstructure with precipitation hardening achieved by addition of scandium.
Figure 3:
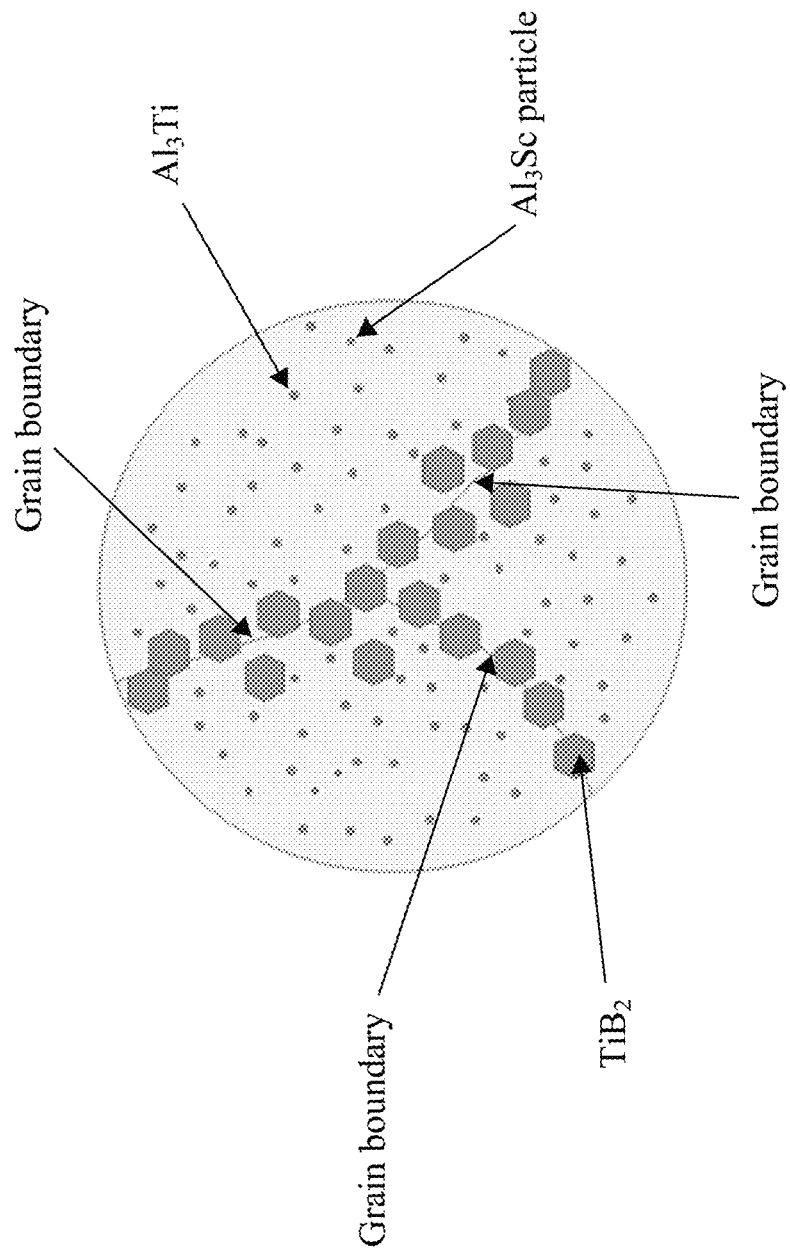
FIG. 3 schematically represents the microstructure of a nonlimiting Al—Ti—B—Sc metal matric composite (MMC). The relative sizes of the particles are not to scale.

In preferred embodiments, after heat treating the component includes a microstructure similar to the type schematically represented in FIG. 3, where relatively large $TiB_2$ particles (e.g., greater than two micrometers in average diameter) are situated along or within aluminum grain boundaries to provide grain boundary strengthening, and other precipitated particles are dispersed in the aluminum grains. In the Al—Ti—B—Sc alloy embodiment represented in FIG. 3, the microstructure includes an aluminum matrix with a majority of ceramic $TiB_2$ particles adjacent or within the grain boundaries and intermetallic $Al_3Ti$ and $Al_3Sc$ particles (e.g., less than 100 nm in diameter) dispersed throughout the grains. The specific locations of the reinforcing particles may be dependent on the cooling rate. For example, slower cooling results in an increased likelihood of $TiB_2$ particles segregating toward the grain boundaries. Therefore, it should be understood that some $TiB_2$ particles may be located within the grains, and if desired the $TiB_2$ particles could be dispersed throughout the grains.

In preferred embodiments, the component is an Al—Ti—B—Sc MMC having $TiB_2$ particles with an average size (i.e., diameter or largest dimension) of about 100 nanometers to about ten micrometers, more preferably about two micrometers to five micrometers, and most preferably about two micrometers, and $Al_3Sc$ particles with an average size of about two nanometers to 100 nanometers, and more preferably about two nanometers to twenty-five nanometers.

Investigations leading to the present invention indicated that components produced by additive manufacturing Al—Ti—B MMCs as described herein exhibit increased strength relative to cast aluminum alloy and MMCs components having similar compositions. Specifically, these additive manufacturing techniques increase high temperature performance of Al—Ti—B MMCs, including Al—$TiB_2$, Al—$Al_3Ti$, and Al—$TiB_2$—$Al_3Ti$ systems, through grain refinement, precipitation hardening, and secondary phase strengthening. Notably, the methods described herein have successfully produced Al—Ti—B—Sc MMCs having $Al_3Ti$ and $TiB_2$ that are finer than those produced through conventional casting and heat treatment. These finer particles are capable of yielding superior strength and mechanical properties, with the result that the methods disclosed herein and the structural components produced therefrom are superior to conventional casting and heat treatment methods and components they produce. The finer particle sizes are produced at least in part due to the relatively rapid cooling rate of the additive manufacturing process, which may also increase the amount of nucleation sites of the precipitates within the aluminum grains yielding grain refinement.

In general, advantages of the components produced as described herein include a homogeneous dispersion of reinforcing particles in an aluminum alloy matrix; strengthening through dispersion of ceramic reinforcing $TiB_2$ particles at the grain boundaries; simultaneously solution and precipitation hardening with intermetallic reinforcing particles of $Al_3Ti$ and/or $Al_3Sc$ located inside aluminum grains; and production of complex shaped Al—Ti—B MMCs with high strength for high temperature applications (e.g., greater than 350° C.). Therefore, components produced using the methods described herein are well suited for structural components for various high-temperature applications including, but not limed to, engines and components thereof for use in applications including, but not limited to, internal combustion engines for use in automotive applications.

Figure 5:
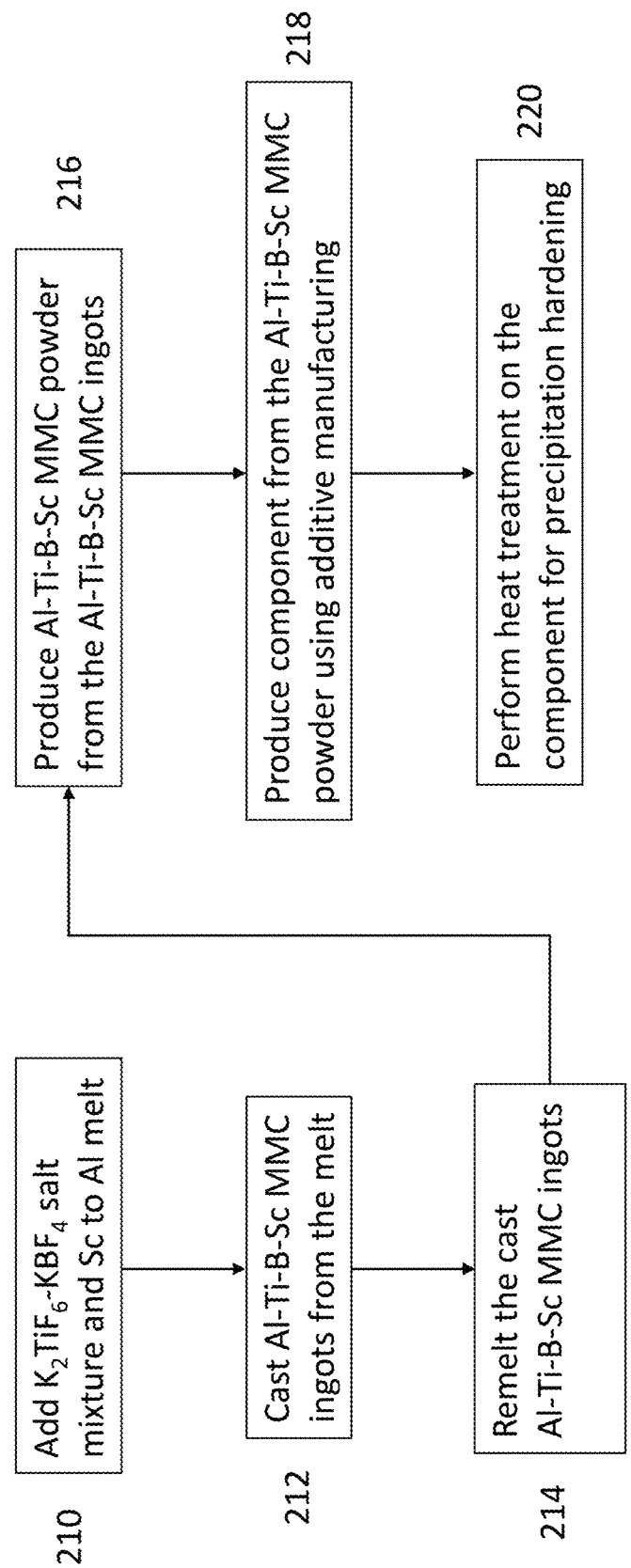
FIGS. 5 and 6 schematically represent methods of producing Al—Ti—B—Sc MMCs in accordance with certain nonlimiting aspects of the invention.
Figure 6:
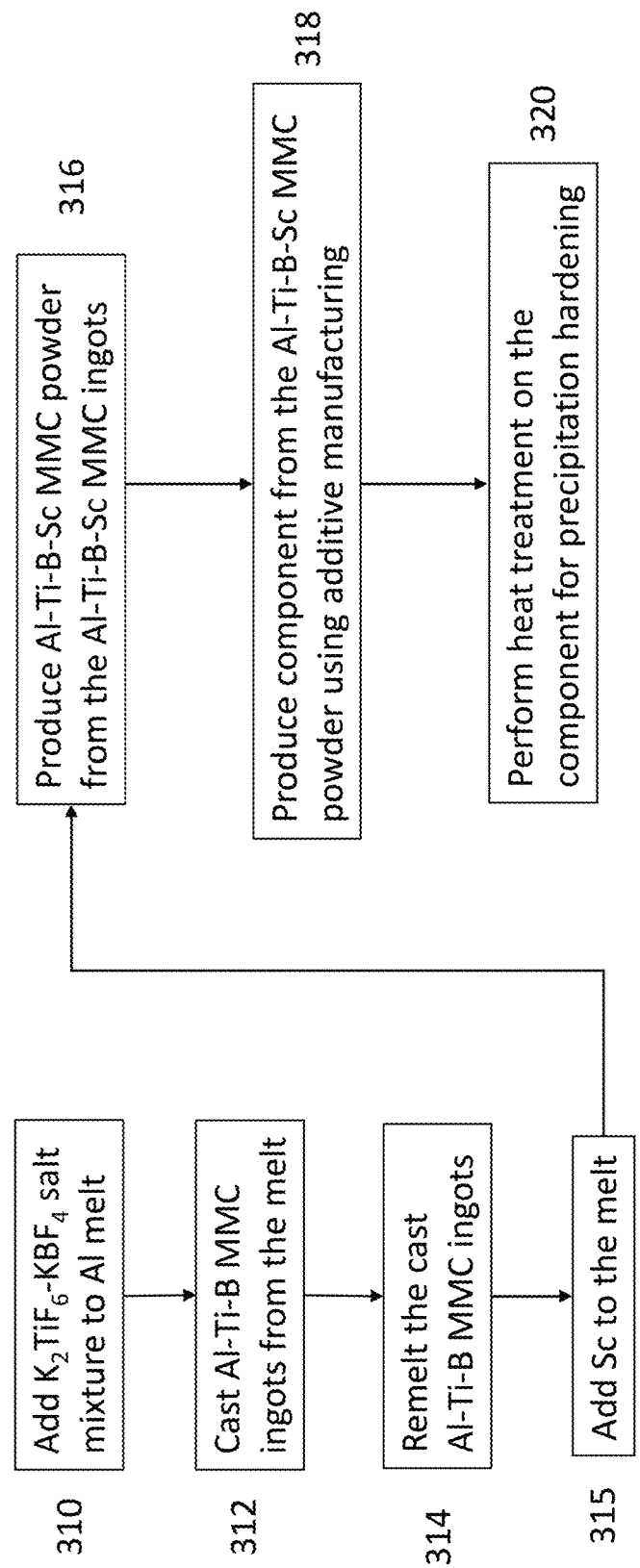

FIGS. 5 and 6 represent nonlimiting methods for producing Al—Ti—B—Sc MMCs in accordance with the above description. FIG. 5 includes steps 210 through 220 wherein scandium is added to the first melt in step 210, and FIG. 6 includes steps 310 through 320 wherein scandium is not added to the first melt in step 310 and instead added to the second melt in step 315. Although the examples provided herein focus on Al—Ti—B MMCs comprising scandium and precipitating $Al_3Sc$, it is within the scope of the invention that Al—Ti—B MMCs may be produced with other alloying elements, particularly rare earth elements are discussed above, with or in lieu of scandium. As a nonlimiting example, a component may be produced to have an Al—Ti—B MMC comprising zirconium and $Al_3Zr$ precipitates. It is also foreseeable and within the scope of the invention that Al—Ti—B MMCs may be produced with the methods disclosed herein without additional reinforcing particles, that is, alloying elements such as Sc and Zr are not added to precipitate intermetallic compounds.

While the invention has been described in terms of specific or particular embodiments, it is apparent that other forms could be adopted by one skilled in the art. For example, the components may have various different appearances and constructions, process parameters such as temperatures and durations could be modified, and appropriate materials could be substituted for those noted. In addition, the invention encompasses additional embodiments in which one or more features or aspects of different disclosed embodiments may be combined. Accordingly, it should be understood that the invention is not necessarily limited to any embodiment described herein. It should also be understood that the phraseology and terminology employed above are for the purpose of describing the disclosed embodiments, and do not necessarily serve as limitations to the scope of the invention. Therefore, the scope of the invention is to be limited only by the following claims.

The invention claimed is:

1. A method for manufacturing a component formed of an Al—Ti—B metal matrix composite, the method comprising:
   reacting a salt mixture with molten aluminum to form a first melt;
   adding at least one alloying element comprising scandium to the first melt;
   casting an ingot with the first melt, the ingot comprising an aluminum matrix that includes particles of an intermetallic compound of aluminum and scandium in the aluminum matrix and contains dispersions of TiB2 particles;
   remelting the ingot to form a second melt;
   forming a powder from the second melt using an atomization process, the TiB2 particles being dispersed within aluminum matrices of particles of the powder; and
   fabricating the component utilizing the particles of the powder in an additive manufacturing process;
   wherein the Al—Ti—B metal matrix composite of the component comprises an aluminum matrix that contains aluminum grains, and at least some of the TiB2 particles are situated along and/or within grain boundaries of the aluminum grains to provide grain boundary strengthening.

2. The method of claim 1, wherein the salt mixture comprises K2TiF6-KBF4.

3. The method of claim 1, wherein the additive manufacturing process is powder power bed fusion or material jetting.

4. The method of claim 1, further comprising adding the at least one alloying element to the second melt wherein the powder includes particles of the intermetallic compound of aluminum and the at least one alloying element in the aluminum matrix.

5. The method of claim 1, wherein the at least one alloying element comprises a rare earth element.

6. The method of claim 1, wherein the intermetallic compound is $Al_3Sc$.

7. The method of claim 1, wherein the at least one alloying element comprises zirconium and the intermetallic compound comprises $Al_3Zr$.

8. The method of claim 1, wherein the metal matrix composite further comprises zirconium.

9. The method of claim 4, further comprising performing a heat treatment on the component that causes precipitation hardening by precipitating the intermetallic compound.

10. The method of claim 9, wherein the intermetallic compound comprises $Al_3Sc$.

11. The method of claim 1, wherein the intermetallic compound comprises $Al_3Sc$, the average size of the $TiB_2$ particles is about 100 nanometers to 10 micrometers, and the average size of the particles of the intermetallic compound is about 2 nanometers to 100 nanometers.

12. The method of claim 1, wherein the aluminum matrix of the ingot further contains a dispersion of $Al_3Ti$ particles, the remelting of the ingot dissolves the $Al_3Ti$ particles, the atomization process causes second $Al_3Ti$ particles to be dispersed within the aluminum matrices of particles of the powder, and the aluminum matrix of the Al—Ti—B metal matrix composite of the component comprises the second $Al_3Ti$ particles dispersed inside the aluminum grains.

* * * * *